Patented Jan. 17, 1939

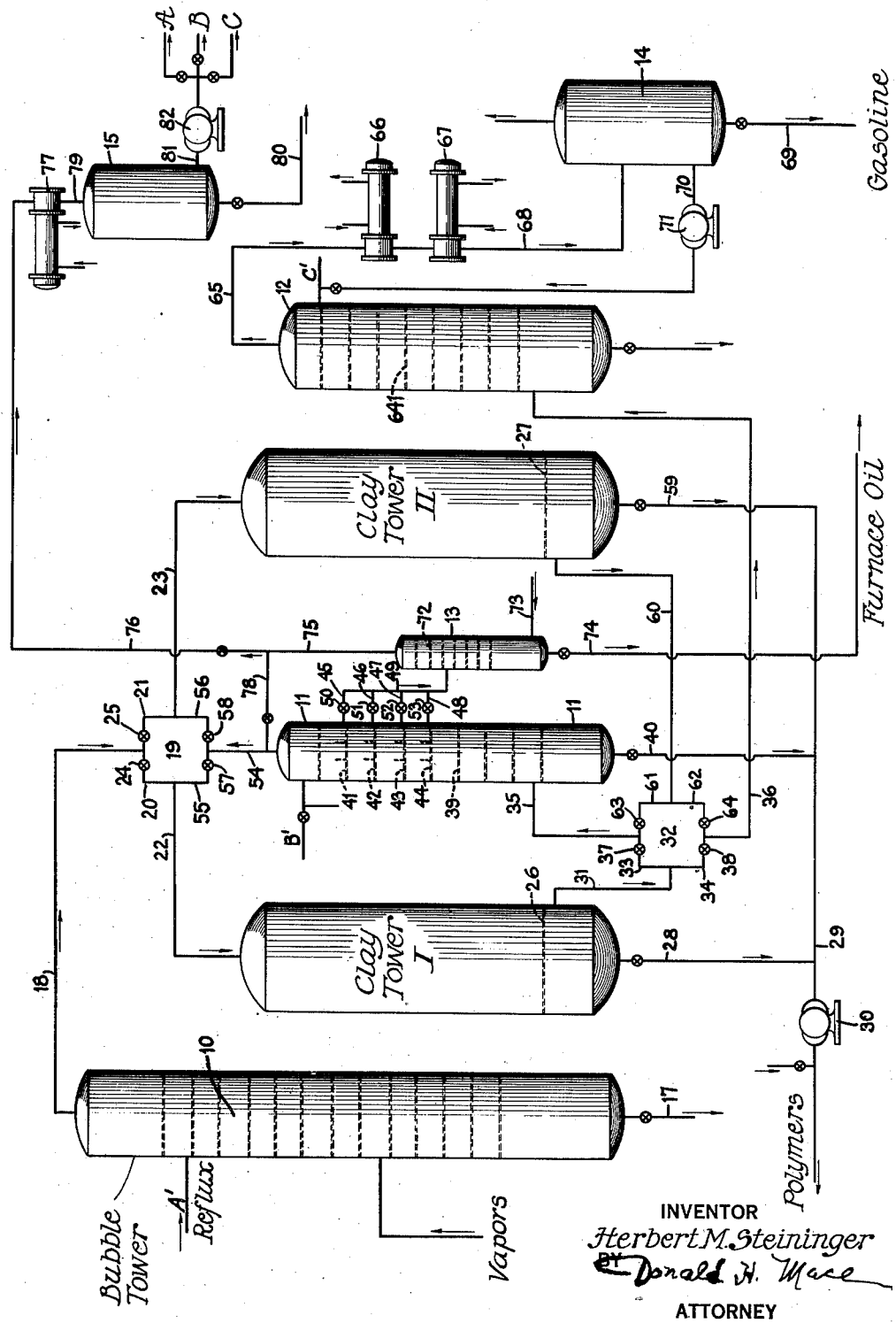

2,144,276

UNITED STATES PATENT OFFICE 2,144,276

TREATING HYDROCARBON PRODUCTS

Herbert M. Steininger, Kansas City, Mo., assignor to Standard Oil Company, a corporation of Indiana Application August 23, 1934, Serial No. 741,075

1 Claim. (Cl. 196—94)

This invention relates to the treatment of hydrocarbon products to remove objectionable unsaturates therefrom and thereby improve the stability of the products with respect to the formation of undesirable color and gum compounds. More particularly my invention pertains to a method of treating hydrocarbons containing two or more component products which require different degrees of treatment of the nature above mentioned.

One of the primary objects of my invention is to produce a simple and more efficient method of effecting such treatment which requires a lesser amount of operating equipment and consequently reduces the initial installation cost and the subsequent maintenance expense.

In one of its broader aspects, my invention contemplates a process of treating hydrocarbon products to remove objectionable unsaturates and to improve the stability of the products with respect to color and gum compounds wherein a combined mixture of hydrocarbons containing two or more component products which require different degrees and types of treatment may be initially treated in a common apparatus and the component products thereafter separated and subjected to further selective treatment as desired.

As one example of a method embodying my invention, a combined stream of hydrocarbon vapors from a cracking operation or cracked vapor products from a rerunning operation containing the normal gasoline and furnace oil constituents may be initially treated by adsorbent material such as clay to improve the color and stability of the furnace oil constituents to the desired extent, after which the gasoline and furnace oil may be segregated and the gasoline constituents subjected to more complete treatment for further improving its color and stability, whereas the furnace oil component may be separately collected as a final product or subjected to further treatment as desired.

As a further example of a method of treating embodying my invention, a stream of hydrocarbon oils within the normal gasoline range produced by cracking sulfur-bearing petroleum oil, may be initially treated by an adsorbent material, the gasoline thereafter separated into lighter and heavier ends, the heavier ends of gasoline subjected to a further desulfurizing treatment and the lighter ends subjected to additional treatment by adsorbent material.

With the above objects and advantages in view, the invention will be best understood by reference to the accompanying drawing which is a schematic illustration showing an apparatus suitable for carrying my invention into effect. In general the apparatus may comprise a fractionating or bubble tower 10, clay towers I and II, and intermediate fractionating tower 11, a final fractionating tower 12, a stripping chamber 13, and receiving tanks 14 and 15, together with suitable pipe lines, pumps, valves and other appurtenant equipment for carrying out the processes in the manner hereinafter described.

Hydrocarbon vapors from a cracking or distilling apparatus (not shown are introduced into an intermediate section of the fractionating tower 10, which may be a bubble tower, and are therein subjected to fractionation to condense heavier constituents therefrom. The heavier condensed constituents are withdrawn from the bottom of the bubble tower 10 through line 17 and may be returned to a cracking apparatus for conversion into lower boiling hydrocarbons.

In accordance with one method of carrying out my invention the temperature at the top of the bubble tower 10 is controlled so that gasoline and furnace oil components of the original vapors remain uncondensed and are removed from the bubble tower through line 18.

The stream of vapors containing the gasoline and furnace oil components withdrawn from bubble tower 10 through line 18 is passed to a manifold 19 having branch lines 20 and 21 which connect with lines 22 and 23 leading to clay towers I and II respectively. Branch lines 20 and 21 are provided with valves 24 and 25 respectively, so that the stream of vapors from the line 18 may be passed to one or the other of the clay treating towers. For example, when it is desired to introduce the combined vapors into clay tower I the valve 24 will be opened and the valve 25 will be closed. Both clay towers I and II are of the same construction and are provided with perforated plates 26 and 27 located in the lower portion of the towers I and II respectively which serve to support beds of adsorbent material such as clay. For purposes of illustration, clay tower I will be considered as the initial clay treating tower, with the understanding that valves 24 and 25 may be operated periodically to change the circulation so that the vapors pass initially through clay tower II. With this in mind the vapors from the top of the bubble tower 10 containing both gasoline and furnace oil components pass through lines 18, 20, and 22 and enter the top of clay treating tower I. The vapors then pass downwardly through the bed of adsorbent material which serves to polymerize objectionable unsaturated constituents of the vapors into higher boiling products, a considerable portion of which condenses into liquid within the tower and tends to accumulate in the bottom thereof.

The liquid polymers accumulating in the bottom of clay tower I are withdrawn through line 28 which is connected with line 29 provided with pump 30 which may pass the polymers to cracking equipment (not shown), or to any other treating apparatus desired. The passage of vapors through the tower I and the time and character of treatment therein is controlled to improve the stability of the furnace oil components, with respect to color and gum compounds, to the desired extent.

The treated vapors from the clay tower I are withdrawn through line 31 to manifold 32 having branch lines 33 and 34 which connect with lines 35 and 36 leading to intermediate fractionating tower 11 and after-fractionating tower 12 respectively. Branch lines 33 and 34 of the manifold 32 are provided with valves 37 and 38 respectively so that vapors from clay tower I may be caused to pass to either or both of the two fractionating towers 11 and 12. When tower I is employed as the initial treating tower as hereinbefore described, valve 37 is open and valve 38 closed, so that the vapors after being treated in tower I pass to the intermediate fractionating tower 11 and are therein subjected to fractionation. The tower 11 is provided with any suitable fractionating elements such as baffle plates 39. The temperature of the fractionating tower 11 is controlled to condense the remaining polymers formed in the clay tower I and the furnace oil constituents of original vapors, without condensing the gasoline constituents. For example, the temperature at the top of the tower 11 may be maintained in the neighborhood of 450° F. to produce a gasoline having an end point of about 400° F. The heavy condensed constituents having a boiling point higher than that desired for the furnace oil, and containing polymerized constituents, collect in the bottom portion of the fractionating tower 11 and are withdrawn through line 40, connected with the line 29, for recycling to the cracking zone, or for subjection to further treatment as desired.

The fractionating tower 11 is provided with a plurality of trap-out trays 41, 42, 43, and 44, provided with outlet pipes 45, 46, 47, and 48 respectively, connected with a manifold line 49 leading to the stripping chamber 13. The intermediate fraction collected on trap-out trays 41 to 44 principally constitutes the furnace oil product. By regulating valves 50, 51, 52, and 53 in outlet lines 45 to 48 inclusive, the intermediate fraction may be withdrawn from any one or more of the trap-out trays so as to effectively control the end point of the furnace oil product.

Uncondensed vapors containing the gasoline constituents are withdrawn from the fractionating tower 11 through line 54 and are passed to the manifold 19 which has branch lines 55 and 56 connecting with lines 22 and 23 respectively. Branch lines 55 and 56 are provided with valves 57 and 58 respectively so that the vapors may pass to either of clay towers I and II. When clay tower I is employed as the initial treating tower, as before described, valve 58 is open and valve 57 closed, so that the vapors from the intermediate fractionating tower 11 pass through lines 54, 56, and 23 to the top of clay tower II. The gasoline vapors passing through the bed of adsorbent material in clay tower II are subjected to more complete treatment to further polymerize objectionable unsaturates which tend to produce color and gum compounds. The liquid polymers formed in clay tower II are withdrawn through line 59 connected to line 29 and may be treated as hereinbefore described.

The vapors after passing through the bed of adsorbent material in clay tower II are withdrawn through line 60 and passed to manifold 32, which has branch lines 61 and 62 connecting with lines 35 and 36 respectively. Branch lines 61 and 62 are provided with valves 63 and 64 so that the vapors from clay tower II may pass to either of the fractionating towers 11 and 12. In accordance with the process hereinbefore described wherein clay tower II serves to treat the final gasoline vapors, the valve 64 will be open and valve 63 closed so that vapors pass from clay tower II through lines 60, 62, and 36, to the final fractionating tower 12. Fractionating tower 12 is provided with suitable fractionating elements such as baffle plates 641 so that the gasoline vapors containing uncondensed and/or entrained polymers formed within clay tower II are subjected to fractionation to condense heavy constituents therefrom and to produce gasoline having the desired end point.

The vapors remaining uncondensed in the tower 12 and containing the gasoline constituents are withdrawn through line 65 and passed through condensers 66 and 67. As illustrated, the condensers are of the indirect heat exchange type provided with pipe connections for circulation of a suitable cooling medium. The liquid gasoline, together with uncondensed vapors pass from condenser 67 through line 68 to receiving drum 14 wherein uncondensed vapors and treated gasoline distillate separate. The treated gasoline is withdrawn from receiving drum 14 through line 69 and may be passed to suitable storage tanks (not shown). If desired a portion of gasoline distillate may be withdrawn through line 70 provided with pump 71 and returned to the upper portion of the final fractionating tower 12 to serve as a cooling and reflux medium therefor.

In the process hereinbefore described, combined gasoline and furnace oil components are initially treated in clay tower I to improve the furnace oil component the desired amount, after which the furnace oil component is separated in the intermediate fractionating tower 11 and the gasoline component subjected to further treatment in clay tower II. As before mentioned, after removing the catalyst in one tower, the circulation may be periodically reversed so that the initial treatment is effected in clay tower II and the final treatment in clay tower I. To accomplish this, valves 25 and 57 in manifold 19 are opened and valves 24 and 58 are closed, whereas valves 63 and 38 in manifold 32 are opened and valves 37 and 64 are closed. When regulated in this manner vapors from the bubble tower 10 pass through lines 18, 21, and 23 to clay tower II. Vapors are withdrawn from clay tower II through line 60 and pass through lines 61 and 35 to the intermediate fractionating tower 11 wherein the furnace oil component is condensed. Vapors containing the gasoline component are passed from the tower 11 through lines 54, 55, and 22 to clay tower I wherein final treatment is effected. Vapors from clay tower I pass through lines 31, 34 and 36 to fractionating tower 12 for final fractionation.

The furnace oil component separately collected as an intermediate fraction in one or more of the trap-out trays 41 to 44 inclusive is withdrawn through the manifold line 49 and passed to the stripping chamber 13, preferably provided with suitable fractionating elements 72 and wherein the intermediate fraction is stripped of any lighter constituents which may be present. In order to accomplish this, the stripping chamber 13 may be provided with a line 73 for introducing steam or other gaseous stripping medium. The furnace oil stripped of its lighter gasoline constituents is withdrawn from the stripping chamber 13 through the line 74 and may be passed to suitable storage receptacles or to further treating equipment (not shown).

Vapors stripped from the furnace oil fraction within the stripping chamber 13 are withdrawn from the chamber through line 75 and may pass through line 76 to a condenser 77, or may be passed through line 78 to the vapor line 54 leading from the intermediate fractionating tower 11. In event that steam is employed as a stripping medium it is ordinarily desirable to pass the vapors through line 76 to condenser 77. When hydrocarbon gases (such as fixed gases from a cracking operation) are employed as a stripping medium the vapors from line 75 may be, and preferably are, passed to line 54 so that the gasoline constituents of the vapors are subjected to additional treatment in the final clay tower. The condenser 77 serves to condense the water and the gasoline constituents. The liquid and gaseous products from the condenser 77 pass through line 79 to receiving tank 15 wherein the water and liquid hydrocarbons separate. The water may be withdrawn from the chamber 15 through line 80 and the hydrocarbon distillate withdrawn through line 81. The hydrocarbon distillate withdrawn through line 81 may be returned by pump 82 to the upper end of any one or more of the fractionating towers 10, 11, and 12, to serve as a refluxing and cooling medium therein. To this end the gasoline hydrocarbon distillate may be divided into streams A, B, and C and returned to fractionating towers 10, 11, and 12 at points A', B', and C', respectively.

The bed of adsorbent material in the initial clay tower (which may be either clay tower I or II) wherein the combined gasoline and furnace oil components are treated may be partly spent or partly degraded material so that the furnace oil fraction passing through the initial tower is subjected to only a mild treatment, and the final clay tower wherein only the gasoline component is treated may contain a relatively fresh bed of adsorbent material so that the final gasoline vapors are subjected to a more complete treatment. In accordance with this mode of operation when the final bed of adsorbent material, through which the gasoline vapors pass, is sufficiently spent so that further treatment of the gasoline component is no longer economically advisable, the initial tower is recharged with fresh adsorbent material and the flow of vapors reversed so that the freshly charged tower is employed for final treatment of the gasoline component, whereas the other tower containing clay which has become partly spent during the operation is employed for the initial treatment of gasoline and furnace oil components.

In certain cases, particularly when the vapor products subjected to treatment contain a relatively large proportion of furnace oil constituents, the period of operation between recharging and reversal of flow may be determined by the character of the initial bed. In other words, the treatment may be continued until the initial clay bed is sufficiently spent so continued treatment no longer improves the furnace oil component the desired extent or when further treatment becomes uneconomical and the initial clay tower may then be recharged with fresh material and the flow of vapors reversed, as before explained, so that the fresh bed is used for treating the final gasoline component.

In certain other cases, for example, when vapors comprising principally of gasoline constituents are treated and only the lighter ends of gasoline, after being separated in the intermediate fractionating tower, are subjected to further treatment, it is sometimes desirable to maintain the initial clay bed relatively fresh as compared with the final bed so that combined vapors will pass through the more highly active adsorbent material and the lighter separated component further passed through the less active material.

When treating vapors from a cracking operation containing the normal amounts of gasoline and furnace oil constituents it will be desirable in most instances to control the operating cycle, with respect to the recharging with adsorbent material and the reversal of vapor flow, so as to give the desired treatment to the gasoline constituents since the gasoline fraction must meet the more exacting specifications with respect to the presence of color and gum compounds. Furthermore, as a matter of practice, it has been found that a bed of adsorbent material which has been used for treating the gasoline constituents until it is no longer effective for accomplishing the desired treatment is still sufficiently active to accomplish the desired improvement in the furnace oil component throughout the operating cycle. Thus the adsorbent which has been employed for treating gasoline vapors until further treatment of gasoline is no longer economically advisable may be subsequently employed for giving the desired treatment to furnace oil without requiring handling of adsorbent material and with the minimum of operating equipment. As before mentioned the initial treatment of the combined stream of gasoline and furnace oil components is controlled to improve the stability of the furnace oil component with respect to color and gum compounds without regard to the extent or degree of treatment of the gasoline component since the treatment of the gasoline component may be controlled in the final treating tower. The temperature conditions maintained during the treating operation will be determined by the character and particularly the end point of the products desired, it being understood that the intermediate fractionating tower will be maintained at a temperature which will cause the heavier component to condense. As a specific example, when treating gasoline and furnace oil temperature and pressure at the top of the bubble tower 10 may be maintained in the neighborhood of 475° F. and 175 pounds per square inch, respectively, in which case the vapors being treated may comprise about 6 parts of the gasoline constituents to one part of furnace oil constituents and the temperature at the top of the intermediate fractionating tower 11 may be in the neighborhood of about 450° F. so that the end point of the gasoline may be about 400° F. The temperature in the initial clay treating bed will be approximately that at the top of the bubble tower 10 and the temperature in the final clay treating bed will be approximately that maintained at the top of the intermediate fractionating tower 11.

The operating pressure may vary from substantially atmospheric to relatively high superatmospheric pressure such as about 400 or 500 pounds per square inch. As a specific example, when treating combined gasoline and furnace oil the pressure in the treating equipment may be about 150 pounds per square inch. The pressure may be maintained uniform throughout the treating equipment except for pressure differences necessary to effect the desired flow or the two clay treating towers may operate under different pressures.

In treating gasoline hydrocarbon products from sulfur-bearing petroleum oils as hereinbefore mentioned, the combined vapors containing the light and heavy ends of gasoline are initially treated in the first clay tower, and thereafter fractionated in the intermediate tower 11 to separate the gasoline vapors into light and heavy ends. The light ends of the gasoline will then be subjected to further treatment in the final clay tower as hereinbefore described and the heavy ends collected in the trap-out trays 41 to 44 may be subjected to desulphurizing treatment such as, for example, by subjecting the heavy ends to treatment with sulphuric acid.

While I have described the invention as initially treating hydrocarbon vapors containing two component products, and the two products thereafter separated, in the intermediate fractionating tower 11, and each subjected to further individual treatment, it will be clear that a greater number of component products may be initially treated in the first clay treating tower and thereafter separated, in the intermediate fractionating tower 11, as a plurality of intermediate fractions and each fraction then subjected to any additional treatment desired. Thus, for example, the fractions collected in the separate trap-out trays 41 to 44 inclusive, rather than passing to a common manifold pipe 49, may be passed to separate stripping chambers and thereafter collected and passed to storage receptacles or subjected to further individual treatment. Moreover, if desired, additional clay treating towers may be arranged in series with an intermediate separating chamber or fractionating tower positioned between successive (or adjacent) towers so that more than one component product may be given selective further treatment while in vapor phase and the vapor products progressively separated in separate fractionating towers after being treated a desired amount in the preceding beds of adsorbent material.

The terms clay and adsorbent material as employed herein are intended to mean solid selective polymerizing agents effective to promote polymerization of undesirable and gum forming constituents to compounds having higher boiling points. Such material may comprise fuller's earth and various types of clay, either natural or acid treated.

While the preferred embodiment has been described for purposes of illustration, it is understood that the invention embraces such other modifications or variations as come within the scope and spirit thereof and that it is not my intention to limit the invention except as necessary to distinguish from prior art.

I claim:

A method of treating hydrocarbon products containing gasoline and furnace oil components, to remove objectionable unsaturates therefrom, which comprises treating a mixture of said components as vapors with an adsorbent material capable of polymerizing objectionable unsaturates which tend to produce color and gum compounds in a first treating stage to refine the furnace oil components to the desired degree while effecting partial refining of said gasoline components, separating and removing from said thus treated vapors polymers formed in the first treating stage, fractionating the remaining vapors to condense a furnace oil fraction substantially free from high boiling polymers and containing some gasoline constituents, separately distilling said furnace oil to remove gasoline constituents therefrom as vapors, separately collecting the furnace oil substantially free from high boiling polymers as a refined product of the process, directly combining vapors from said distilling operation with vapors remaining after the fractionating operation, treating the combined partially refined vapors in a second separate treating stage with adsorbent material to effect further polymerization of objectionable unsaturates contained therein to further refine the vapors to the desired extent, separating polymers so formed from said vapors and fractionating said vapors to separate a fraction containing gasoline constituents refined to the desired extent.

HERBERT M. STEININGER.